April 14, 1953     H. H. MILLER     2,635,169
ELECTRIC WAFFLE IRON AND HEATING ELEMENT THEREFOR
Filed Jan. 4, 1951
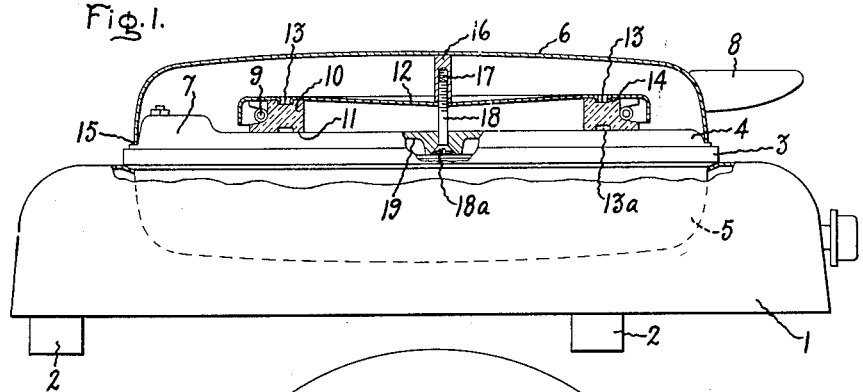
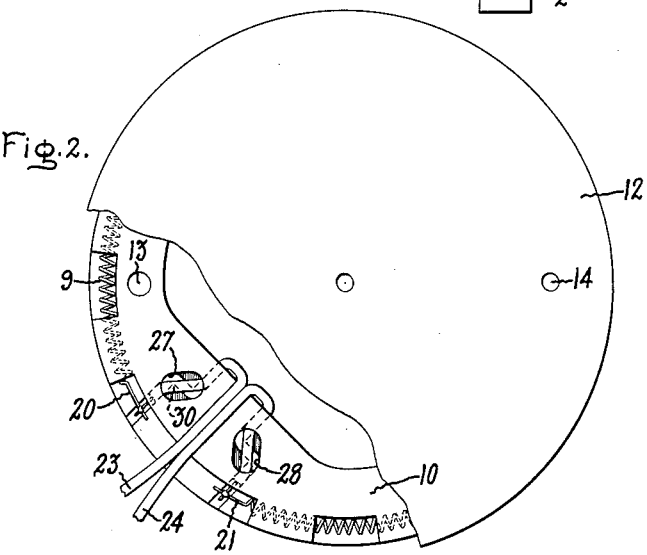
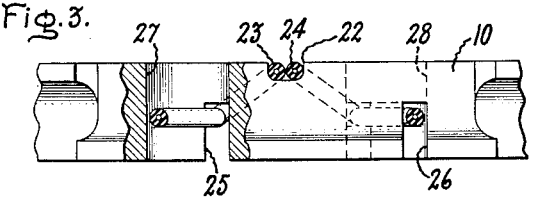
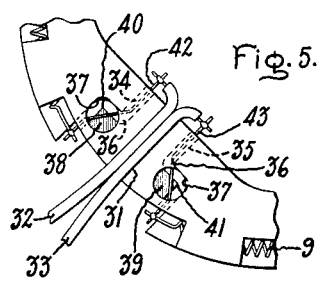
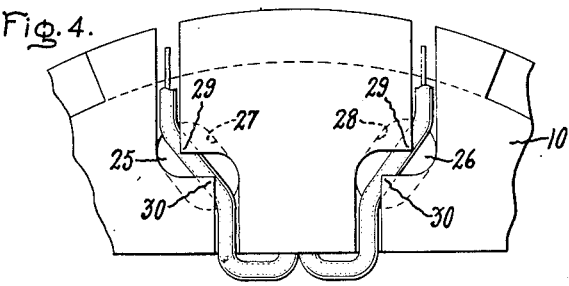
Inventor:
Homer H. Miller,
by *[signature]*
His Attorney.

UNITED STATES PATENT OFFICE 2,635,169

ELECTRIC WAFFLE IRON AND HEATING ELEMENT THEREFOR

Homer H. Miller, Bridgeport, Conn., assignor to General Electric Company, a corporation of New York Application January 4, 1951, Serial No. 204,368

6 Claims. (Cl. 219—19)

This invention relates to cooking appliances, and more particularly to an improved electric heating element and supporting means therefor for waffle irons, sandwich grills, and similar electrically heated appliances.

An object of my invention is to provide an improved support for the heating element of an electric appliance, including an arrangement for electrical connection to the heating element terminals.

Another object of my invention is to provide improved means for supporting a heating element within an appliance, such as a waffle iron, along with an improved arrangement for securing the outer enclosing shell in position.

Another object of my invention is to construct a heating element support for a cooking appliance, including an arrangement for anchoring the lead-in electrical connecting wires to the support.

Still another object of my invention is to provide an improved heating element support, facilitating assembly and electrical connections to the heating element ends while providing improved safety features against electrical shock and short circuits.

In accomplishment of the foregoing objectives, one of the features of my invention consists in securing the heating element support to the grid or grill plate of a cooking appliance through a pressure plate, which in turn is retained in position by a threaded fastening member extending through the grid plate into engagement with a sleeve nut affixed to the shell enclosing the heating element assembly. Another feature of my invention is directed to the heating element support which includes a channel in one of its faces for reception of insulated lead-in wires, with a Z-shaped slot on the opposite face of the support into which preformed lead-in wires may be placed for connection to the heating element terminal ends. This construction is arranged to provide internal projecting corners to retain the lead-in wires in position.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a side elevation, partially in section, through a waffle iron embodying my invention; Fig. 2 is a top plan view, with a portion thereof broken away, of a heating element assembly embodying my invention; Fig. 3 is a side elevation, partially in section, of a portion of the device shown by Fig. 2; Fig. 4 is a bottom plan view of a portion of the device shown by Fig. 2; and Fig. 5 is a partial top plan view of a modified form of my invention.

Referring now to the drawing, in Fig. 1 I have shown my invention embodied in a cooking appliance in the form of an electric waffle iron having a base housing 1 carrying suitable supporting feet 2. Housing 1 may take any suitable form and is adapted to support the operating components of the waffle iron, which include a lower grid plate 3 and upper grid plate 4. Each grid plate in turn is provided with an enclosing shell for the heating element assembly associated therewith. In the present instance, I have shown such a shell 5 for the lower grid plate and a similar shell 6 for the upper grid plate. As will be understood, the two grid plates are pivotally connected to each other by suitable hinge means, such as the construction disclosed and claimed by my copending application Serial No. 203,121, filed December 28, 1951 and assigned to the assignee of the present invention. While I have not shown any of the details of this hinge construction, it may be noted that upper grid plate 4 is enlarged as at 7 for reception of components of the hinge assembly. A suitable heat insulating handle 8 may be attached to upper shell 6 to facilitate opening and closing of the upper grid assembly with respect to the lower grid plate.

In Fig. 1, I have shown in detail the arrangement for supporting a suitable heating element 9 with respect to the grid plate, which means also serves to attach shell 6 in assembled relation. While I have not shown similar details for the lower grid assembly, it is to be understood that I contemplate employing a similar construction therefor.

As shown in Fig. 1, and more particularly in Fig. 2, heating element 9 is in the form, in this exemplified embodiment, of a helically coiled resistance wire encircling a groove extending around the periphery of a support 10. Support 10 preferably is made from a suitable heat resistant, insulating material and typically is ceramic. While in the present arrangement I have shown support 10 in the form of an annular ceramic brick, it may be understood that this support may assume other forms depending upon the particular application involved. As shown in Fig. 1, support 10 has a face 11 adapted to be positioned in contiguous relation with a back surface of grid element 4. The opposite face of support 10 is engaged by a pressure plate 12 which is adapted to hold the heating element and support accurately in position with respect to grid plate 4. Preferably, the support is formed with a plurality of indentations 13 in its outer face to receive lanced projections 14 on the pressure plate. Similarly, the opposite face of the support includes a plurality of recesses or indentations 13a to receive projecting bosses on the back side of grid plate 4. Shell 6 encloses the entire heating element assembly with its outer edge adapted to rest on a shoulder 15 formed on the grid plate. To secure shell 6 and pressure plate 12 in desired positions with respect to the grid, I attach centrally of the shell a sleeve nut 16, for example, by a welding process. Sleeve 16 is internally threaded as at 17 to receive a screw 18 having its head 18a recessed centrally on the baking face 19 of the grid. The length of sleeve nut 16 is selected so that its exposed end will contact the pressure plate 12 before the edges of the shell seat on shoulder 15 of the grid. Therefore, as screw 18 is threaded into nut 16, the pressure plate will be drawn toward the grid plate with a slight deflection, as shown in Fig. 1, to clamp securely the heating element support against the grid plate. As screw 18 is threaded further into the sleeve, outer shell 6 is seated on shoulders 15 of the grid.

With this construction, it may be seen that the stress of supporting the heating element, support, and pressure plate, is not carried by the outer shell. This permits the outer shell to be drawn or otherwise fabricated from relatively light weight material without appreciable danger of dimpling the shell at the point of attachment of the retaining means. With the present construction, all of the stress involved in retaining the heating element assembly in position is transferred directly from the grid plate to the pressure plate. Therefore, the welded connection between sleeve nut 16 and the shell is necessary only for the purpose of retaining the shell in position.

Referring to Figs. 2, 3 and 4, I have shown in detail my improved arrangement for connecting electrical power supply leads to the ends or terminals 20 and 21 of the heating element. On the face of support 10 away from the grid plate, I form a radial channel 22 of appropriate depth and width to receive insulated power supply conductors 23 and 24, as clearly shown by Figs. 2 and 3. Since these conductors are exposed to relatively high temperatures, I prefer to insulate them with a suitable asbestos or other heat resistant covering. Thus, conductors 23 and 24 extend radially inwardly within channel 22 intermediate the positions of terminal ends 20 and 21 of the heating element. As shown in Fig. 4, the contiguous or lower face of support 10 is formed with a pair of Z-shaped slots 25 and 26 to receive respectively conductors 23 and 24. From the opposite or top face of the support, recesses 27 and 28 extend inwardly to the corresponding Z-shaped slots. With this construction it may be seen that projecting corners 29 and 30 of the Z-shaped slot extend into each of the recesses.

In assembly, conductors 23 and 24 extend radially inwardly on the exposed face of the support through channel 22. On the inside surface of the support, the conductors are bent over at right angles and extend toward the grid plate and into the Z-shaped slots. Preferably, the conductors are preformed so that they may be readily slipped into the slots. The outer end of each conductor may then be pulled to further deform the portion of the wire within its corresponding recess, whereupon it extends diagonally through the recess and is held in position within the support by projecting corners 29 and 30. Suitable connections may then be made between each of the conductors and a terminal end of the heating element, for example, by welding.

With this construction the sharp re-entrant bend in each conductor internally of the support, plus the positioning of the conductors in their respective slots in the face of the support contiguous to grid, serves to anchor the conductors in position and thus relieve strain from the terminals of the heating element. As shown in Fig. 1, pressure plate 12 extends over substantially the entire support. However, a small portion of the pressure plate adjacent conductors 23 and 24 may be cut out and suitably deformed to provide a smooth surface and thus avoid abrasion of these conductors. The projecting corners resulting from each Z-shaped slot and its corresponding recess serve to retain the conductors securely in position within the support. Therefore, there is no appreciable risk of the conductor insulation coming into contact with the highly heated surface of the grid plate, nor is there appreciable danger of short circuiting between the conductors.

In Fig. 5 I have shown a modified arrangement for connecting the heating element terminals to the lead wires. In this embodiment I provide a similar channel 31 through the exposed face of the support to receive the incoming power supply conductors 32 and 33. On the face of the support contiguous with the grid plate, I provide slots 34 and 35 extending outwardly through the support and including two right angle bends 36 and 37. From the opposite or exposed face of the support, a pair of recesses 38 and 39 extend inwardly toward the slots to form corners 40 and 41 projecting into the recesses. In this embodiment the terminal ends 42 and 43 of the heating element 9 are preformed with corresponding right angle bends to be inserted into the slots. Upon insertion of these ends into the support past the projecting corners, each of the heating element wires is given a longitudinal stress to force it diagonally across the corner whereby it is retained in position within the support. As shown in Fig. 5, in this embodiment I connect the lead conductors 32 and 33 to the heating element terminals adjacent the inside annular surface of the support. With the arrangement thus shown, a pressure plate may be employed as in the previously described embodiment to retain the conductors within the radially extending slot in the exposed face of the support.

In either arrangement as above described, it may be noted that I provide a substantially straight channel in one face of the heating element support and a pair of spaced channels in the opposite face presenting tortuous paths for respective electrical conductors. Each of these tortuous channels is further arranged to provide one or more overhanging corners or projections extending into the channel to retain a conductor in position. Since, normally, the support is made by molding from ceramic material, recesses or apertures are formed in the first face extending inwardly to respective of the tortuous channels in alignment with the overhanging projections. Such a construction permits direct molding of the entire support, including the internal overhanging portions. While in the above embodiments I have shown projecting corners to retain the conductors in their respective slots, obviously other configurations of the tortuous channels and overhanging projections could be employed with equal facility and effectiveness.

While the present invention has been described by reference to particular embodiments thereof, it is to be understood that numerous modifications may be made by those skilled in the art without departing from the essence of my invention. I, therefore, aim in the appended claims to cover all such equivalent variations as come within the true spirit and scope of the foregoing disclosure.

What I claim as new and desire to secure by Letters Patent of the United States is:

1. In an electric appliance, a grid element, a heating element support of heat resistant insulating material having one face positioned against the back surface of said grid element, a heating element carried around an outer surface on said support in spaced parallel relation with said one face and having the terminal ends thereof adjacent each other, said support including a pair of recesses extending inwardly from the opposite face thereof with said recesses being positioned in spaced relation and adjacent said terminal ends, means defining Z-slots on said one face of said support positioned respectively in superimposed relation to said recesses and adapted to receive lead wires, the corners of each of said Z-slots projecting into its respective recess, channel means in said opposite face of said support for receiving lead wires extending radially inwardly from an outer edge intermediate said recesses, a pair of lead wires extending radially inwardly through said channel means and outwardly through respective of said slots for connection to said heating element terminals, stress applied to each of said wires after insertion in their respective Z-slots being effective to draw them diagonally of said recesses for retention therein by said projecting corners, a pressure plate overlying said opposite face of said support, and means drawing said pressure plate against said support and said support against said grid.

2. A heating means for an electric waffle iron having a grid element comprising a heating element support of heat resistant insulating material having a face adapted to be positioned contiguous with the grid element, a heating element extending around said support in parallel spaced relation with the grid element and having adjacent terminal ends therefor, means defining a pair of Z-shaped slots extending inwardly from the contiguous face of said support and adapted to receive respective lead conductors for said heating element terminals, means defining a pair of recesses in said support extending inwardly from the opposite face thereof into respective of said Z-slots, channel means in said opposite face extending radially inwardly from an outer edge intermediate said recesses for receiving a pair of lead conductors, a pair of lead conductors extending together through said channel means radially inward on said support and then outwardly through their respective Z-shaped slots for connection to said terminals, stress applied to said lead conductors deforming their initial Z-shape to a diagonal across said recess.

3. In an electric waffle iron, a heat distributing grid element, a heating element support which rests on the top surface of said grid element, a heating element carried on said support, a pressure plate for clamping said support against said grid element, an outer shell extending over said pressure plate, heating element, and support and having outer edges engaging said grid element, an internally threaded sleeve nut positioned beneath said shell with its upper end fixed centrally to said shell and its lower end projecting downwardly into engagement with said pressure plate, and a screw projecting loosely up through said grid element, support and pressure plate into threaded engagement with said sleeve nut, the head of the screw being positioned beneath the grid element where it is accessible for turning the screw, said screw when turned in said sleeve nut drawing the lower end of said sleeve nut down against said pressure plate whereby said heating element and support are retained in position with respect to said grid and said shell is attached to said grid without stress on said shell for supporting said heating element and said support.

4. In an electrically heated appliance, a grid element, a heating element support of heat resistant insulating material, a heating element carried around said support and having adjacent terminals therefor, a pair of lead-in conductors for said terminals, means defining a pair of Z-shaped slots extending inwardly from a face of said support and adapted to receive said lead-in conductors, and means defining a conductor passage diagonally across the middle leg of each of said Z-shaped slots internally of said support to define corners which overlie each slot and the conductor therein to retain the conductors in position within said support, a pressure plate cooperatively engaging said support, an enclosing shell extending over said support and pressure plate and having an edge engageable with the grid element, a sleeve nut affixed centrally to said shell and having a length greater than the normal unstressed spacing between said shell and said pressure plate, and threaded fastening means extending from the grid element into engagement with said sleeve nut and screwed into said nut to pull the lower end of the nut into engagement with said pressure plate to clamp it against said support and bring the edge of said shell into engagement with said grid element.

5. In an electrically heated appliance, an annular heating element support of heat resistant insulating material having upper and lower faces, a heating element carried around said support and having adjacent terminals, walls defining in said support in the vicinity of said terminals a Z-shaped slot which extends across one of the faces of said support to a depth less than the thickness of said support and a passage which extends diagonally across the middle leg of said Z-shaped slot spaced inwardly from said one face whereby there is provided at the middle leg of the Z-shaped slot corners beneath which said diagonal passage extends, a lead-in conductor positioned in said slot and diagonal passage and located under said corners, the structure permitting of the conductor being first bent into Z shape and inserted down to the bottom of said Z-shaped slot and then pulled longitudinally to bring portions of said conductor under said corners to hold the conductor in the slot, and means connecting said conductor to a terminal.

6. In an electrically heated cooking appliance, a heat distributing grid element, an annular support positioned on said grid element, a heating element carried by said support, a pressure plate positioned on said support for clamping the support against said grid element, an enclosing shell positioned over said support and pressure plate with its edge in engagement with said grid element, a sleeve nut located beneath said shell having its upper end fixed to the under side of the shell and its lower end in engagement with said pressure plate, said sleeve nut having a length greater than the normal unstressed distance between said shell and said pressure plate, and a screw projecting loosely up through said grid element, support and pressure plate and threaded into said sleeve nut, the head of said screw being located beneath said grid element where it is accessible for turning, and when turned serves to pull the pressure plate down into tight engagement with said support.

HOMER H. MILLER.

References Cited in the file of this patent

UNITED STATES PATENTS

| Number | Name | Date |
|---|---|---|
| 1,122,521 | Madsen | Dec. 29, 1914 |
| 1,613,770 | Reichold | Jan. 11, 1927 |
| 1,617,026 | Neylon | Feb. 8, 1927 |
| 1,630,402 | Vaughan | Aug. 14, 1928 |
| 1,705,727 | Forshee | Mar. 19, 1929 |
| 2,134,350 | Woolley | Oct. 25, 1938 |
| 2,241,067 | Holm-Hansen | May 6, 1941 |
| 2,247,229 | Foster | June 24, 1941 |
| 2,282,089 | Propernick | May 5, 1942 |
| 2,495,638 | Miller | Jan. 24, 1950 |